United States Patent
Lin et al.

(10) Patent No.: US 10,965,604 B2
(45) Date of Patent: *Mar. 30, 2021

(54) DEADLOCK AVOIDANCE IN LEAF-SPINE NETWORKS

(71) Applicant: Cisco Technology, Inc., San Jose, CA (US)

(72) Inventors: Liangi Lin, Monte Sereno, CA (US); Thomas J. Edsall, Los Gatos, CA (US); Ayan Banerjee, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,082

(22) Filed: Aug. 20, 2019

(65) Prior Publication Data

US 2019/0379607 A1 Dec. 12, 2019

Related U.S. Application Data

(63) Continuation of application No. 15/979,865, filed on May 15, 2018, now Pat. No. 10,454,839.

(51) Int. Cl.
| | |
|---|---|
| G06F 11/00 | (2006.01) |
| H04L 12/823 | (2013.01) |
| H04L 12/44 | (2006.01) |
| H04L 12/741 | (2013.01) |
| H04L 12/859 | (2013.01) |
| H04L 12/26 | (2006.01) |
| H04L 12/851 | (2013.01) |
| H04L 12/865 | (2013.01) |

(52) U.S. Cl.
CPC .............. *H04L 47/32* (2013.01); *H04L 12/44* (2013.01); *H04L 43/0882* (2013.01); *H04L 43/16* (2013.01); *H04L 45/745* (2013.01); *H04L 47/2425* (2013.01); *H04L 47/2475* (2013.01); *H04L 47/6275* (2013.01)

(58) Field of Classification Search
CPC ................................ H04L 47/32; H04L 12/44
See application file for complete search history.

(56) References Cited

U.S. PATENT DOCUMENTS

| | | |
|---|---|---|
| 9,742,683 B1 | 8/2017 | Vanini et al. |
| 9,860,116 B1 | 1/2018 | Jain et al. |
| 2014/0376373 A1 | 12/2014 | Deshpande et al. |

(Continued)

*Primary Examiner* — Bo Hui A Zhu
(74) *Attorney, Agent, or Firm* — Edell, Shapiro & Finnan, LLC (57) ABSTRACT

Techniques for implementing deadlock avoidance in a leaf-spine network are described. In one embodiment, a method includes monitoring traffic of a plurality of packets at a leaf switch in a network having a leaf-spine topology. The method includes marking a packet with an identifier associated with an inbound uplink port of the leaf switch when the packet is received from one of a first spine switch and a second spine switch. The method includes detecting a valley routing condition upon determining that the packet marked with the identifier is being routed to an outbound uplink port of the leaf switch to be transmitted to the first spine switch or the second spine switch. Upon detecting the valley routing condition, the method includes dropping packets associated with a no-drop class of service when a packet buffer of the inbound uplink port reaches a predetermined threshold.

20 Claims, 6 Drawing Sheets

(56) References Cited

U.S. PATENT DOCUMENTS

2015/0188808 A1 7/2015 Ghanwani et al.
2018/0019947 A1 1/2018 Shpiner et al.
2018/0041360 A1 2/2018 Shen et al.
2018/0205657 A1 7/2018 Owada et al.

FIG.6

DEADLOCK AVOIDANCE IN LEAF-SPINE NETWORKS

CROSS REFERENCE TO RELATED APPLICATION

This application is a continuation of U.S. application Ser. No. 15/979,865, filed May 15, 2018, the entirety of which is incorporated herein by reference.

TECHNICAL FIELD

This disclosure relates generally to traffic routing in leaf-spine networks.

BACKGROUND

Networking architectures have grown increasingly complex in communication environments. Traditional hierarchical data center networks are built in layers that resemble a hierarchical tree. A hierarchical tree architecture typically has an access layer at the bottom of the tree, an aggregation layer in the middle of the tree, and a core layer at the top of the tree. More recently, data centers have been implementing a leaf-spine topology for network architectures. In leaf spine networks, a switching fabric provides an access layer comprising multiple leaf switches that are typically fully meshed to multiple spine switches. The leaf switches provide access to the switching fabric for hosts or endpoints at the bottom of the tree such as servers, firewalls, loadbalancers, appliances, routers (e.g., to other networks), etc. Each spine switch maintains routing information for all endpoints. The routing information is maintained in the switch process memory and also in a layer 3 (L3) routing lookup table. A fully populated switching fabric may contain millions of endpoints.

DESCRIPTION OF EXAMPLE EMBODIMENTS

Overview

Presented herein are techniques for implementing deadlock avoidance in a leaf-spine network. In an example embodiment, a method includes monitoring traffic of a plurality of packets at a leaf switch in a network having a leaf-spine topology. The network includes a first spine switch connected to the leaf switch and a second spine switch connected to the leaf switch. The method also includes marking a packet of the plurality of packets with an identifier associated with an inbound uplink port of the leaf switch when the packet is received from one of the first spine switch and the second spine switch. The method includes detecting a valley routing condition in the network upon determining, by the leaf switch, that the packet marked with the identifier associated with the inbound uplink port of the leaf switch is being routed to an outbound uplink port of the leaf switch to be transmitted to one of the first spine switch and the second spine switch. Upon detecting the valley routing condition in the network, the method includes dropping packets associated with a no-drop class of service, at the leaf switch, when a packet buffer of the inbound uplink port reaches a predetermined threshold.

Example Embodiments

Leaf-spine network architecture has been widely adopted for use in large data centers. Leaf-spine topology provides a non-blocking, low latency network that enables use of remote direct memory access (RDMA) over converged Ethernet (RoCE) protocol for modern data centers with latency-sensitive database workloads. In order to support RoCE, a Priority Flow Control (PFC) protocol is used to provide lossless service. PFC protocol is defined by The Institute of Electrical and Electronics Engineers (IEEE) standard 802.1Qbb, which may also be referred to as Class-based Flow Control (CBFC) or Per Priority Pause (PPP). PFC is a mechanism that prevents frame loss that is due to congestion and functions on a per class-of-service basis. For example, lossless service may be provided by creating a no-drop class of service for certain packets. Whenever there is a route-churn that causes a traffic flow to traverse a path that includes two spine switches, known as a valley routing condition, transient routing loops may be created. These transient routing loops in the presence of PFC may lead to a deadlock condition.

Transient routing loops (e.g., valley routing paths) can disappear or dissipate after forwarding tables at all switches in the network reach an eventual steady state. Packets in the transient routing loops are usually dropped due to time-to-live (TTL) mechanisms. For PFC enabled traffic in buffers, however, deadlock can remain without automatically recovering. Such a deadlock condition may affect at least part of an RoCE network and the services running over it. This deadlock may arise when no-drop class of service packets are in the network whenever there are routing table updates or link failures.

Figure 1:
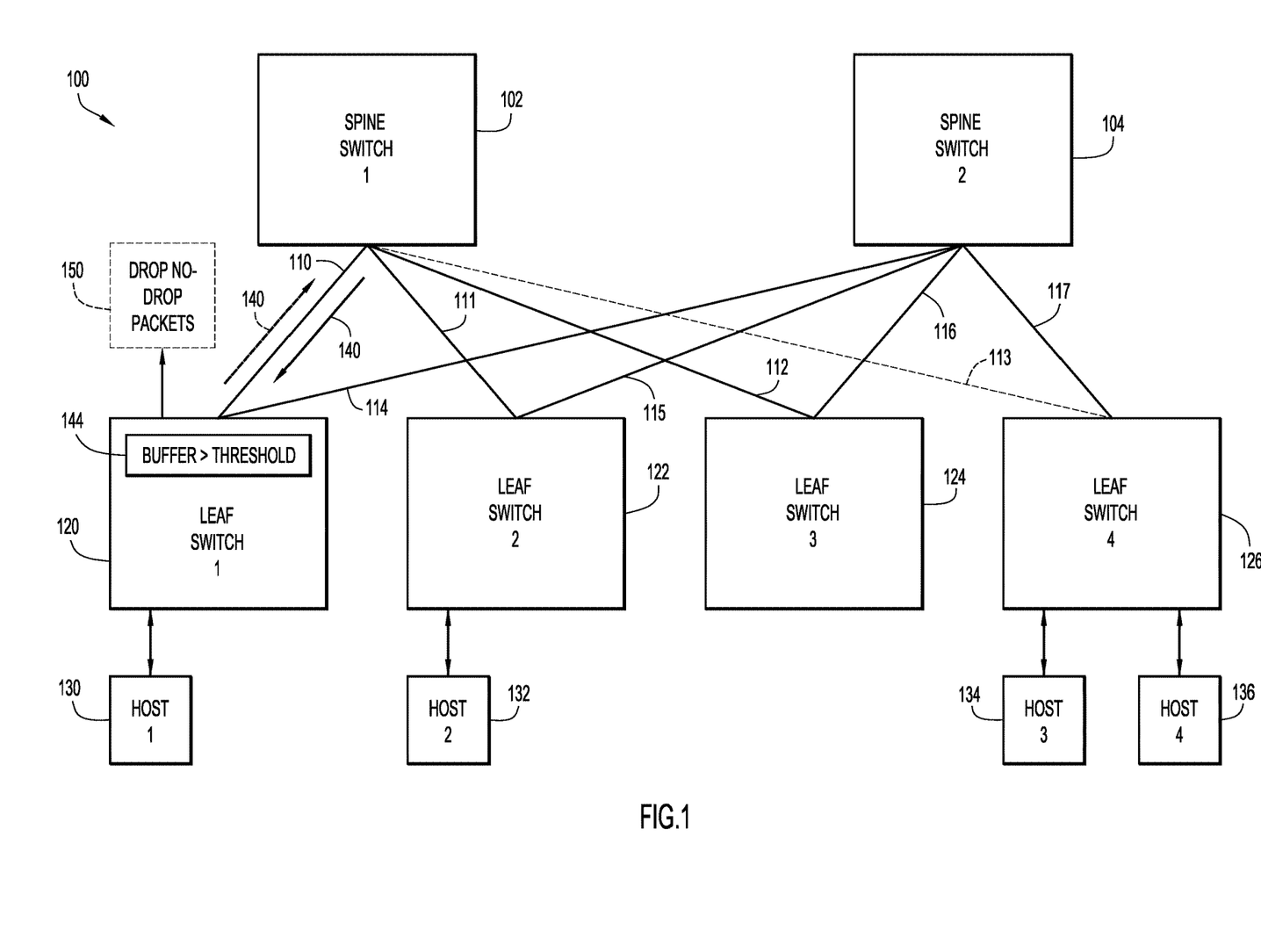
FIG. 1 is a block diagram illustrating a scenario in a leaf-spine network in which techniques for deadlock avoidance may be implemented, according to an example embodiment.

FIG. 1 is a block diagram illustrating a leaf-spine network 100 in which techniques for deadlock avoidance may be implemented according to an example embodiment. Network 100 may be a computer network, or a part of a network, having a leaf-spine topology. Network 100 includes a plurality of spine switches, including a first spine switch 102 and a second spine switch 104, and a plurality of leaf switches, including a first leaf switch 120, a second leaf switch 122, a third leaf switch 124, and a fourth leaf switch 126. Each of spine switches 102, 104, and leaf switches 120, 122, 124, 126 include a plurality of network ports to allow communication with other switches or devices.

In this embodiment, network 100 has a leaf-spine topology, with each spine switch 102, 104 having a link to each leaf switch 120, 122, 124, 126. For example, first spine switch 102 is connected to first leaf switch 120 over a first link 110, and is also connected to second leaf switch 122 over a second link 111, to third leaf switch 124 over a third link 112, and to fourth leaf switch 126 over a fourth link 113. Similarly, second spine switch 104 is connected to first leaf switch 120 over a fifth link 114, and is also connected to second leaf switch 122 over a sixth link 115, to third leaf switch 124 over a seventh link 116, and to fourth leaf switch 126 over an eighth link 117. Connections between spine switches 102, 104, and leaf switches 120, 122, 124, 126 via links 110-117 may be through uplink ports.

Additionally, each leaf switch may be connected to one or more host devices or endpoints. For example, in this embodiment, first leaf switch 120 is connected to a first host device 130, second leaf switch 122 is connected to a second host device 132, and fourth leaf switch 126 is connected to a third host device 134 and a fourth host device 136. Connections between leaf switches 120, 122, 124, 126 and host devices 130, 132, 134, 136 may be through downlink ports. Accordingly, a leaf switch is configured to communicate with a spine switch via an uplink port and is configured to communicate with a host device via a downlink port.

In various embodiments, host devices 130, 132, 134, 136 of network 100 may be network elements or endpoints of any of a variety of types, such as data storage devices, servers, switches, routers, gateways, as well as networking appliances, such as firewalls, intrusion detection systems, etc. The host devices may be physical, virtual (e.g., implemented in software), or a combination of both.

It should be understood that two spine switches 102, 104, four leaf switches 120, 122, 124, 126, and four host devices 130, 132, 134, 136 are illustrated in this embodiment, however, a network, for example, network 100, may include any number of switches and/or host devices. For example, in one embodiment, network 100 may be a data center and may include hundreds, thousands, or more, switches and/or host devices.

In network 100 with leaf-spine topology, any host device (e.g., host devices 130, 132, 134, 136) can transmit a packet that reaches another host device in three hops by traversing a leaf switch to a spine switch, then back to a leaf switch connected to the destination host device (i.e., leaf-spine-leaf). For example, second host device 132 can reach third host device 134 by transmitting a packet from second leaf switch 122 to first spine switch 102 via second link 111, then from first spine switch 102 to fourth leaf switch 126 (where third host device 134 is connected) via fourth link 113.

In such a steady state example, without any link failures or traffic engineering, traffic flows do not ordinarily traverse a path that includes two spine switches, known as valley routing (i.e., spine-leaf-spine). For example, a valley routing path in network 100 may travel from first spine switch 102 to second leaf switch 122 via second link 111 and then from second leaf switch 122 to second spine switch 104 via sixth link 115. When a network, for example, network 100, is free from valley routing paths, transient routing loops are not formed for general traffic flows. These transient routing loops that traverse valley routing paths can cause the occurrence of deadlock conditions in the network.

While enabling unicast reverse path forwarding checks (e.g., strict-URPF) may eliminate transient routing loops in some network topologies, in general, during a route churn, the differential speed of programming the routes on the various network components (e.g., spine switches 102, 104, leaf switches 120, 122, 124, 126, etc.) after a route churn event could allow packet lookups to pass an URPF check, but still end up in a transient routing loop. For example, one switch in the network may forward packets based on an older incarnation or state of the network topology and another switch may forward packets based on a newer incarnation or state of the network topology. During the transient time before each switch reaches a steady state with the new network topology, packets that are already in transit can get into a routing loop. In general, TTL may ordinarily be used to drop such packets, however, in scenarios where PFC is enabled (i.e., no-drop classes of packets), these packets can create a deadlock condition.

The present embodiments described herein will be explained with reference to three scenarios or events during which a deadlock condition in network 100 may occur, including a single link failure, multiple link failures, and a host device relocation. In a first scenario, shown in FIG. 1, a single link between a spine switch and a leaf switch has failed. In this embodiment, fourth link 113 between first spine switch 102 and fourth leaf switch 126 has failed (shown by a broken line in FIG. 1). As a result, first spine switch 102 can only reach fourth leaf switch 126 by bouncing between one of the other leaf switches (e.g., first leaf switch 120, second leaf switch 122, or third leaf switch 124) to second spine switch 104, then to fourth leaf switch 126. In other words, the failure of fourth link 113 creates a valley routing condition (i.e., spine-leaf-spine).

In this scenario, a deadlock condition may occur when first leaf switch 120 has not updated its routing table to reflect the new network topology that takes into account the failure of fourth link 113. For example, first leaf switch 120 may have not yet received the update to the routing table or has not processed it. As a result, a packet 140 sent from first spine switch 102 to first leaf switch 120 that is intended to reach fourth leaf switch 126, is routed by first leaf switch 120, which is using a routing table that has not yet been updated to reflect the failure of fourth link 113, back to first spine switch 102. This scenario can cause a transient routing loop where first spine switch 102 attempts to route packet 140 through first leaf switch 120 according to the new network topology that takes into account the failure of fourth link 113 and first leaf switch 120 attempts to route packet 140 back to first spine switch 102 according to the old network topology that does not take into account the failure of fourth link 113.

As a result, of this loop, a packet buffer associated with first leaf switch 120 may begin to become congested. Ordinarily during congestion, first leaf switch 120 may send a back pressure message to first spine switch 102 to generate a pause for traffic intended for the first leaf switch 120. For example, PFC protocol describes sending a pause frame that indicates which class of service needs to be paused and the length of time that the traffic needs to be paused. When no-drop classes of packets are in network 100, however, the packet buffer associated with first leaf switch 120 cannot be unloaded due to the presence of the no-drop class of packets. Accordingly, in these situations, a deadlock condition can occur where the traffic is paused because the packet buffer is congested, however, because the no-drop class of packets cannot be unloaded from the packet buffer (i.e., cannot be dropped), the paused traffic is not able to resume.

Additionally, in such situations, the deadlock condition can affect not only the original traffic that is paused due to the lack of availability in the packet buffers, but also other traffic within the leaf-spine network since the deadlocked packet buffers are not available to absorb temporary transient increases in received packets. As a result, other traffic that is intended for another leaf switch in the network that originates from a port on a leaf switch that is affected by the deadlock condition is also paused due to inability to unload the no-drop class of packets from the packet buffer to clear the deadlock, thus propagating the deadlock condition throughout the rest of the network.

According to the principles of the example embodiments, techniques for deadlock avoidance may be implemented to prevent reaching the deadlock condition in the network. In an example embodiment, the deadlock condition may be avoided by detecting a valley routing condition as a precursor to the deadlock condition, and taking action in response to prevent deadlock from occurring. The valley routing condition is detected by determining, at a leaf switch, that a packet received from a spine switch is being routed to be transmitted back to a spine switch.

In this embodiment, packet 140 is received at an inbound uplink port of first leaf switch 120. According to an example embodiment, first leaf switch 120 marks packet 140 with an identifier associated with the inbound uplink port of first leaf switch 120 to designate that packet 140 was received from a spine switch (e.g., first spine switch 102). As described in the scenario above, packet 140 may be routed by first leaf switch 120, which is using a routing table that has not yet been updated to reflect the failure of fourth link 113, to be transmitted back to first spine switch 102. In this embodiment, when packet 140 is routed at first leaf switch 120 to be transmitted from an outbound uplink port back to first spine switch 102, first leaf switch 120 detects a valley routing condition. That is, packet 140 was previously marked with the identifier designating that it was received at an inbound uplink port of first leaf switch 120 from a spine switch and is now being routed to an outbound uplink port to be transmitted to another spine switch (e.g., first spine switch 102). This routing path for packet 140 indicates a valley routing condition (i.e., spine-leaf-spine) to first leaf switch 120.

According to the principles of the example embodiments described herein, upon detecting the valley routing condition, first leaf switch 120 may implement techniques for deadlock avoidance. In particular, first leaf switch 120 may check the status of a packet buffer 144 of the inbound uplink port to determine whether or not packet buffer 144 exceeds a predetermined threshold. The predetermined threshold may establish a level of congestion for packet buffer 144 for the inbound uplink port above which packets with a no-drop class of service can be dropped at an operation 150.

In this embodiment, packet buffer 144 exceeds the predetermined threshold and first leaf switch 120 can implement operation 150 to drop packets associated with a no-drop class of service that are headed to the outbound uplink port of first leaf switch 120 to alleviate the congestion and avoid a deadlock condition. First leaf switch 120 may drop no-drop class of service packets at operation 150 in two ways. In a first embodiment, first leaf switch 120 may change a service level of the packets associated with the no-drop class of service to a class of service that is eligible to be dropped. For example, instead of packet 140 being associated with no-drop class of service, upon detecting the valley routing condition, first leaf switch 120 may change the class of service of packet 140 to a service level that permits packets to be dropped. In this manner, packet 140 may not necessarily be dropped unless packet buffer 144 reaches the predetermined threshold. At which point, because the service level of packet 140 has been changed from the no-drop class of service to a class of service that allows packet 140 to be dropped, first leaf switch 120 may alleviate congestion by dropping packet 140 at operation 150. With this arrangement, the congestion is not propagated to the inbound uplink port and deadlock may be avoided in network 100.

In another embodiment, first leaf switch 120 may include a hardware application specific integrated circuit (ASIC) that drops packets associated with a no-drop class of service that are headed to the outbound uplink port of first leaf switch 120 to alleviate the congestion and avoid a deadlock condition when packet buffer 144 reaches the predetermined threshold. In this embodiment, the ASIC (shown in FIG. 6) may receive information associated with packet buffer usage of a plurality of ports of first leaf switch 120. Upon detecting the valley routing condition based on the routing of packet 140 (i.e., spine-leaf-spine), first leaf switch 120 may alleviate congestion by dropping packet 140 at operation 150 when packet buffer 144 reaches the predetermined threshold. With this arrangement, the congestion is not propagated to the inbound uplink port and deadlock may be avoided in network 100.

Figure 2:
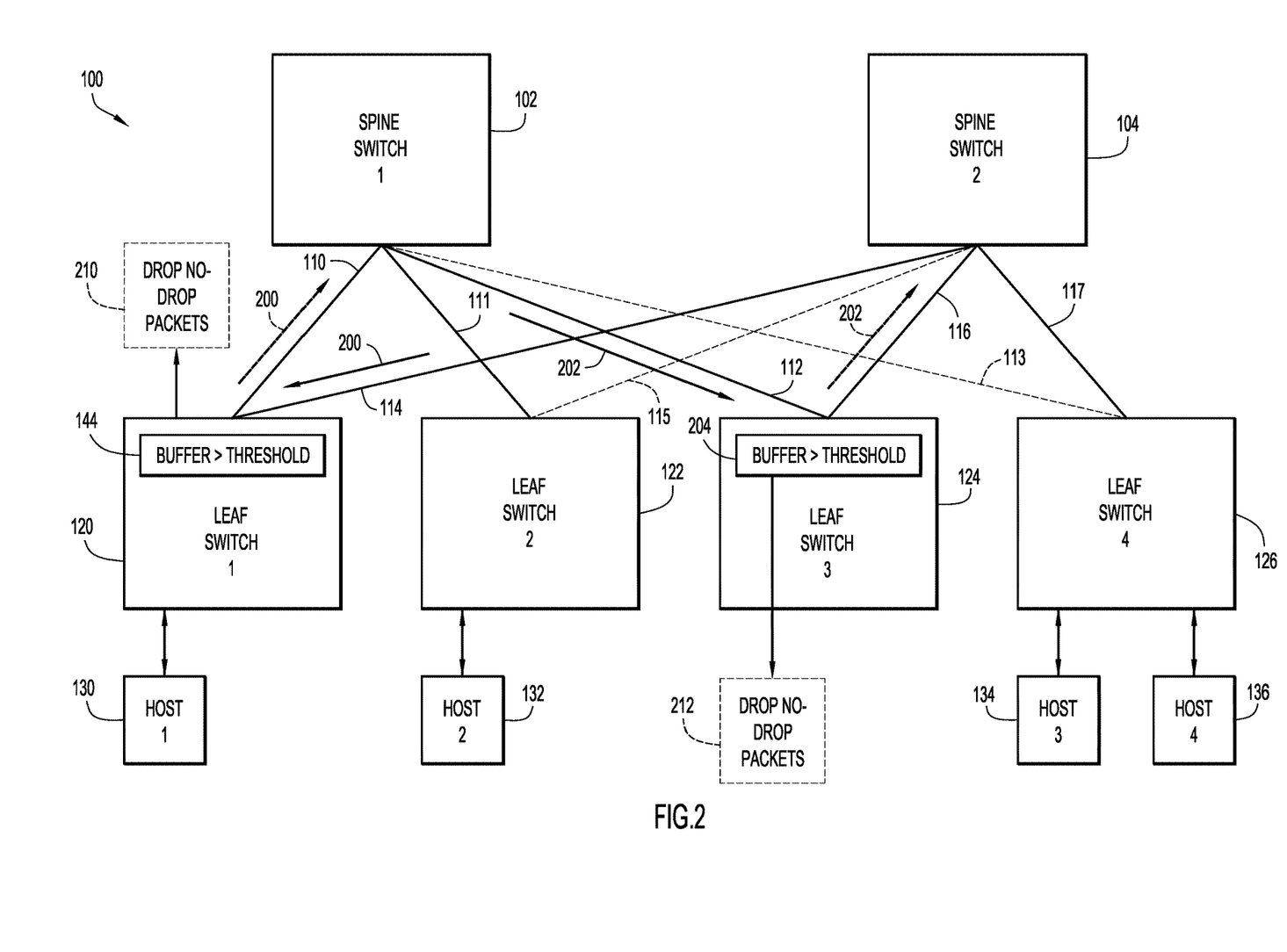
FIG. 2 is a block diagram illustrating another scenario in a leaf-spine network in which techniques for deadlock avoidance may be implemented, according to an example embodiment.

Referring now to FIG. 2, a second scenario in network 100 is illustrated in which techniques for deadlock avoidance may be implemented. In this scenario shown in FIG. 2, multiple link failures have occurred between spine switches and leaf switches. In this embodiment, fourth link 113 between first spine switch 102 and fourth leaf switch 126 has failed (shown by a broken line in FIG. 2), as previously described in reference to FIG. 1, and sixth link 115 between second spine switch 104 and second leaf switch 122 has also failed. As a result, first spine switch 102 can only reach fourth leaf switch 126 by bouncing between one of the other leaf switches (e.g., first leaf switch 120 or third leaf switch 124) to second spine switch 104, then to fourth leaf switch 126. Additionally, second spine switch 104 can only reach second leaf switch 122 by bouncing between one of the other leaf switches (e.g., first leaf switch 120 or third leaf switch 124) to first spine switch 102, then to second leaf switch 122. In other words, the failure of fourth link 113 and sixth link 115 creates multiple valley routing conditions (i.e., spine-leaf-spine).

In this scenario, a deadlock condition may occur when a back pressure message to generate a pause for traffic intended for congested ports at any one or more of leaf switches 120, 122, 124, 126 is propagated through network 100. As previously described, when no-drop classes of packets are in network 100, however, the packet buffers associated with the ports of leaf switches 120, 122, 124, 126 cannot be unloaded due to the presence of the no-drop class of packets. Accordingly, in these situations, the deadlock condition can occur where the traffic is paused because the packet buffers are congested, however, because the no-drop class of packets cannot be unloaded from the packet buffers (i.e., cannot be dropped), the paused traffic is not able to resume.

According to the principles of the example embodiments, techniques for deadlock avoidance may be implemented to prevent reaching the deadlock condition in the network by detecting a valley routing condition as a precursor to the deadlock condition, and taking action in response to prevent deadlock from occurring. As previously described, the valley routing condition is detected by determining, at a leaf switch, that a packet received from a spine switch is being routed to be transmitted back to a spine switch.

In this embodiment, a first packet 200 is received at an inbound uplink port of first leaf switch 120 from second spine switch 104. According to an example embodiment, first leaf switch 120 marks first packet 200 with an identifier associated with the inbound uplink port of first leaf switch 120 to designate that first packet 200 was received from a spine switch (e.g., second spine switch 104). In this embodiment, when first packet 200 is routed at first leaf switch 120 to be transmitted from an outbound uplink port to first spine switch 102, first leaf switch 120 detects a valley routing condition. That is, first packet 200 was previously marked with the identifier designating that it was received at an inbound uplink port of first leaf switch 120 from a spine switch (e.g., second spine switch 104) and is now being routed to an outbound uplink port to be transmitted to another spine switch (e.g., first spine switch 102). This routing path for first packet 200 indicates a valley routing condition (i.e., spine-leaf-spine) to first leaf switch 120.

Similarly, a second packet 202 is received at an inbound uplink port of third leaf switch 124 from first spine switch 102. According to an example embodiment, third leaf switch 124 marks second packet 202 with an identifier associated with the inbound uplink port of third leaf switch 124 to designate that second packet 202 was received from a spine switch (e.g., first spine switch 102). In this embodiment, when second packet 202 is routed at third leaf switch 124 to be transmitted from an outbound uplink port to second spine switch 104, third leaf switch 124 detects a valley routing condition. That is, second packet 202 was previously marked with the identifier designating that it was received at an inbound uplink port of third leaf switch 124 from a spine switch (e.g., first spine switch 102) and is now being routed to an outbound uplink port to be transmitted to another spine switch (e.g., second spine switch 104). This routing path for second packet 202 indicates a valley routing condition (i.e., spine-leaf-spine) to third leaf switch 124.

According to the principles of the example embodiments described herein, upon detecting the valley routing conditions, first leaf switch 120 and third leaf switch 124 may implement techniques for deadlock avoidance. In particular, first leaf switch 120 may check the status of packet buffer 144 of the inbound uplink port to determine whether or not packet buffer 144 exceeds a predetermined threshold above which packets with a no-drop class of service can be dropped at an operation 210. Similarly, third leaf switch 124 may check the status of a packet buffer 204 of the inbound uplink port to determine whether or not packet buffer 204 exceeds a predetermined threshold above which packets with a no-drop class of service can be dropped at an operation 212.

In this embodiment, packet buffer 144 exceeds the predetermined threshold and first leaf switch 120 can implement operation 210 to drop packets associated with a no-drop class of service that are headed to the outbound uplink port of first leaf switch 120 to alleviate the congestion and avoid a deadlock condition. In addition, packet buffer 204 also exceeds the predetermined threshold and third leaf switch 124 can implement operation 212 to drop packets associated with a no-drop class of service that are headed to the outbound uplink port of third leaf switch 124 to alleviate the congestion and avoid a deadlock condition. First leaf switch 120 and/or third leaf switch 124 may drop no-drop class of service packets at operations 210, 212 using either mechanism described above in reference to operation 150 of FIG. 1. For example, by changing a service level of the packets associated with the no-drop class of service to a class of service that is eligible to be dropped, or by providing a hardware ASIC that is configured to drop packets associated with a no-drop class of service to alleviate the congestion and avoid a deadlock condition when the port's packet buffer reaches the predetermined threshold. With this arrangement, the congestion is not propagated to inbound uplink ports and deadlock may be avoided in network 100.

Figure 3:
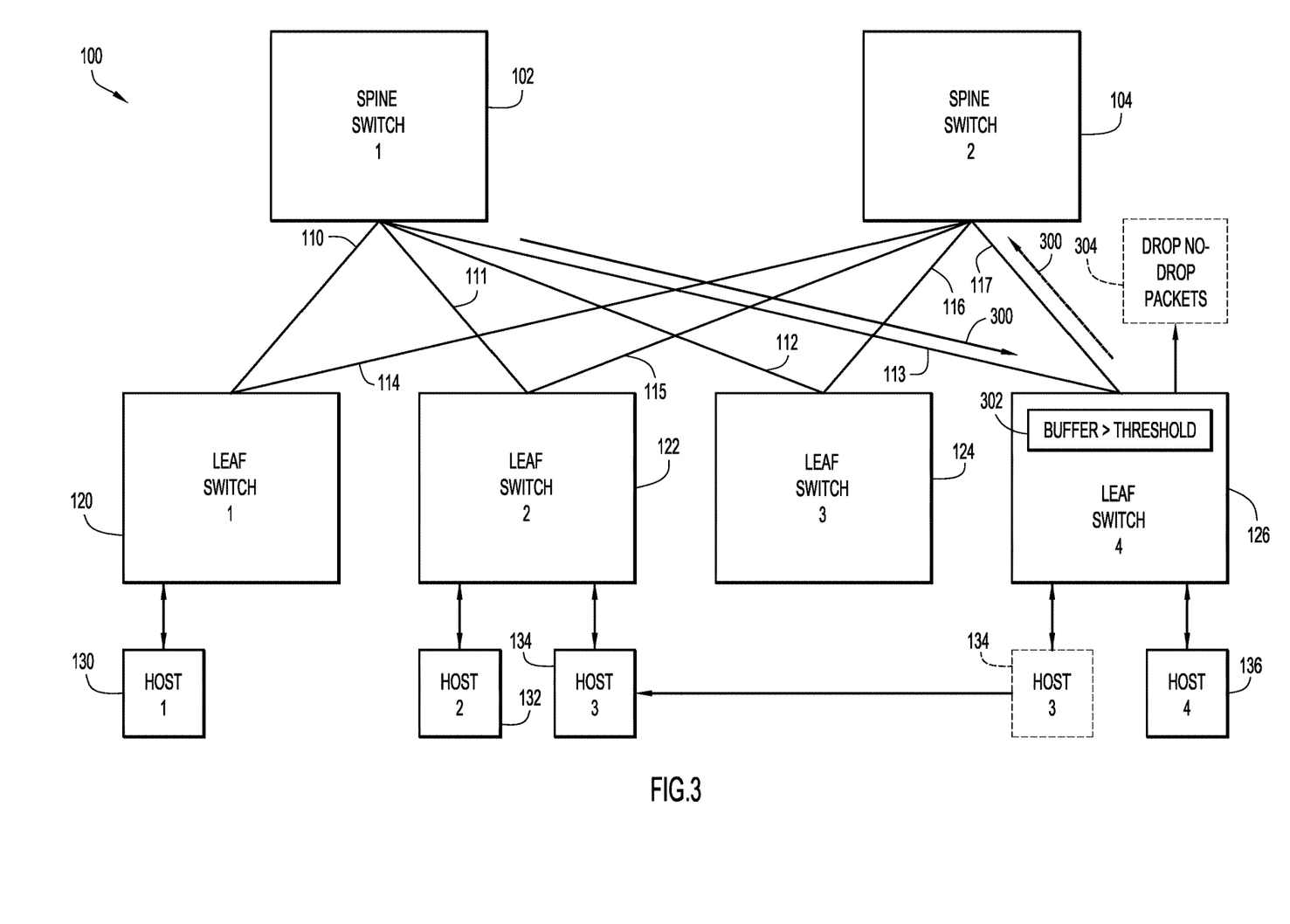
FIG. 3 is a block diagram illustrating another scenario in a leaf-spine network in which techniques for deadlock avoidance may be implemented, according to an example embodiment.

Referring now to FIG. 3, a third scenario in network 100 is illustrated in which techniques for deadlock avoidance may be implemented. In this scenario shown in FIG. 3, a host device has relocated from one leaf switch to a different leaf switch. For example, third host device 134 has relocated from a connection with a downlink port of fourth leaf switch 126 to a connection with a downlink port of second leaf switch 122. In this scenario, a deadlock condition may occur when first spine switch 102 has not updated its routing table to reflect the new network topology that takes into account the relocation of third host device 134 from fourth leaf switch 126 to second leaf switch 122. For example, first spine switch 102 may have not yet received the update to the routing table or has not processed it. As a result, a packet 300 sent from first spine switch 102 to fourth leaf switch 126 that is intended to reach third host device 134, is routed by fourth leaf switch 126 to second spine switch 104 to be transmitted from second spine switch 104 to second leaf switch 122, where third host device 134 is now connected.

According to the principles of the example embodiments, techniques for deadlock avoidance may be implemented in such a scenario to prevent reaching a deadlock condition in network 100. In an example embodiment, the deadlock condition may be avoided by detecting a valley routing condition as a precursor to the deadlock condition, and taking action in response to prevent deadlock from occurring. The valley routing condition is detected by determining, at a leaf switch, that a packet received from a spine switch is being routed to be transmitted back to a spine switch.

In this embodiment, packet 300 is received at an inbound uplink port of fourth leaf switch 126. According to an example embodiment, fourth leaf switch 126 marks packet 300 with an identifier associated with the inbound uplink port of fourth leaf switch 126 to designate that packet 300 was received from a spine switch (e.g., first spine switch 102). When packet 300 is routed at fourth leaf switch 126 to be transmitted from an outbound uplink port to second spine switch 104, fourth leaf switch 126 detects a valley routing condition. That is, packet 300 was previously marked with the identifier designating that it was received at an inbound uplink port of fourth leaf switch 126 from a spine switch (e.g., first spine switch 102) and is now being routed to an outbound uplink port to be transmitted to another spine switch (e.g., second spine switch 104). This routing path for packet 300 indicates a valley routing condition (i.e., spine-leaf-spine) to fourth leaf switch 126.

According to the principles of the example embodiments described herein, upon detecting the valley routing condition, fourth leaf switch 126 may implement techniques for deadlock avoidance. In particular, fourth leaf switch 126 may check the status of a packet buffer 302 of the inbound uplink port to determine whether or not packet buffer 302 exceeds a predetermined threshold above which packets with a no-drop class of service can be dropped at an operation 304.

In this embodiment, packet buffer 302 exceeds the predetermined threshold and fourth leaf switch 126 can implement operation 304 to drop packets associated with a no-drop class of service that are headed to the outbound uplink port of fourth leaf switch 126 to alleviate the congestion and avoid a deadlock condition. Fourth leaf switch 126 may drop no-drop class of service packets at operation 304 using either mechanism described above in reference to operation 150 of FIG. 1. For example, by changing a service level of the packets associated with the no-drop class of service to a class of service that is eligible to be dropped, or by providing a hardware ASIC that is configured to drop packets associated with a no-drop class of service to alleviate the congestion and avoid a deadlock condition when the port's packet buffer reaches the predetermined threshold. With this arrangement, the congestion is not propagated to inbound uplink ports and deadlock may be avoided in network 100.

Figure 4:
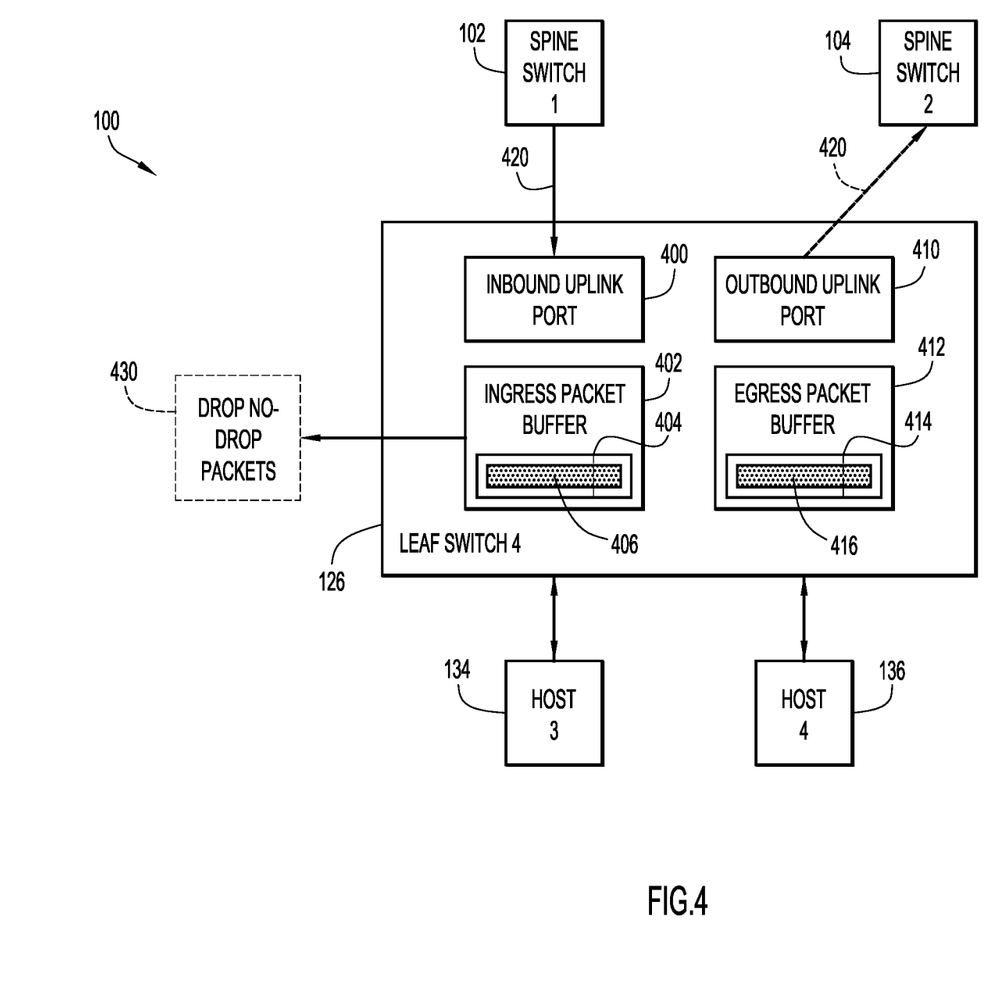
FIG. 4 is a diagram illustrating a leaf switch in a leaf-spine network implementing techniques for deadlock avoidance, according to an example embodiment.

FIG. 4 is a diagram illustrating a representative leaf switch (e.g., fourth leaf switch 126) in leaf-spine network 100 implementing techniques for deadlock avoidance, according to an example embodiment. In this embodiment, fourth leaf switch 126 includes at least one inbound uplink port 400 that is connected to first spine switch 102 and at least one outbound uplink port 410 that is connected to second spine switch 104. Fourth leaf switch 126 may also include a plurality of downlink ports that are connected to host devices, for example, third host device 134 and/or fourth host device 136.

In an example embodiment, each of the plurality of ports of fourth leaf switch 126 may include a corresponding packet buffer. In this embodiment, an ingress packet buffer 402 is associated with inbound uplink port 400 of fourth leaf switch 126 and an egress packet buffer 412 is associated with outbound uplink port 410 of fourth leaf switch 126. Additionally, downlink ports connected to host devices (e.g., third host device 134 and/or fourth host device 136) may also have associated packet buffers (not shown).

In this embodiment, fourth leaf switch 126 receives a packet 420 at inbound uplink port 400. Fourth leaf switch 126 marks packet 420 with an identifier associated with inbound uplink port 400 to designate that packet 420 was received from a spine switch (e.g., first spine switch 102). When packet 420 is routed at fourth leaf switch 126 to be transmitted from outbound uplink port 410 to second spine switch 104, fourth leaf switch 126 detects a valley routing condition. That is, packet 420 was previously marked with the identifier designating that it was received at inbound uplink port 400 of fourth leaf switch 126 from a spine switch (e.g., first spine switch 102) and is now being routed to outbound uplink port 410 to be transmitted to another spine switch (e.g., second spine switch 104). This routing path for packet 420 indicates a valley routing condition (i.e., spine-leaf-spine) to fourth leaf switch 126.

According to the principles of the example embodiments described herein, upon detecting the valley routing condition, fourth leaf switch 126 may implement techniques for deadlock avoidance. In particular, fourth leaf switch 126 may check the status of ingress packet buffer 402 associated with inbound uplink port 400 to determine whether or not packet buffer 402 exceeds a predetermined threshold 404 above which packets with a no-drop class of service can be dropped at an operation 430. Predetermined threshold 404 may be a specified number of pending packets or may be expressed in terms of percentage of capacity of packet buffer 402. In this embodiment, ingress packet buffer 402 has a queue 406, which exceeds predetermined threshold 404. As a result, fourth leaf switch 126 can implement operation 430 to drop packets associated with a no-drop class of service that are headed to outbound uplink port 410 of fourth leaf switch 126 to alleviate the congestion and avoid a deadlock condition.

As described above, fourth leaf switch 126 may drop no-drop class of service packets at operation 430 using either mechanism described above in reference to operation 150 of FIG. 1. For example, by changing a service level of the packets associated with the no-drop class of service to a class of service that is eligible to be dropped, or by providing a hardware ASIC that is configured to drop packets associated with a no-drop class of service to alleviate the congestion and avoid a deadlock condition when the port's packet buffer reaches the predetermined threshold.

Operation 430 may described in more detail according to each mechanism. First, when changing a service level of the packets associated with the no-drop class of service to a class of service that is eligible to be dropped, the service level of the packets may be changed to a drop-eligible class of service when the packet buffer of the inbound uplink port exceeds the predetermined threshold (e.g., queue 406 of ingress packet buffer 402 exceeds predetermined threshold 404), but the packets may only actually be dropped when the packet buffer of the outbound uplink port is also congested above a predetermined threshold.

For example, as shown in FIG. 4, egress packet buffer 412 of outbound uplink port 410 is associated with a predetermined threshold 414 above which packets routed to outbound uplink port 410 that were previously marked with the identifier designating that they were received at inbound uplink port 400 of fourth leaf switch 126 from a spine switch (e.g., first spine switch 102) may be dropped. In this embodiment, a queue 416 at egress packet buffer 412 exceeds predetermined threshold 414, indicating that outbound uplink port 410 is congested. As a result, fourth leaf switch 126 may implement operation 430 to drop packets previously associated with the no-drop class of service. That is, packet 420 traversing a valley routing path (i.e., spine-leaf-spine) is dropped at fourth leaf switch 126 before being transmitted from outbound uplink port 410 to second spine switch 104. With this arrangement, only packets that would traverse the valley routing path are dropped by fourth leaf switch 126 when the predetermined thresholds 404, 414 of both ingress packet buffer 402 and egress packet buffer 412 are exceeded. It should be understood that predetermined threshold 404 for ingress packet buffer 402 associated with inbound uplink port 400 may have a different value than predetermined threshold 414 for egress packet buffer 412 associated with outbound uplink port 410.

Operation 430 may also be implemented according to a second mechanism, where a hardware ASIC (e.g., ASIC 640, shown in FIG. 6) of fourth leaf switch 126 is configured to drop packets associated with a no-drop class of service to alleviate the congestion and avoid a deadlock condition when the port's packet buffer reaches the predetermined threshold. According to this mechanism, when the packet buffer of the inbound uplink port exceeds the predetermined threshold (e.g., queue 406 of ingress packet buffer 402 exceeds predetermined threshold 404), the hardware ASIC (e.g., ASIC 640) monitors where the packets received by the leaf switch are being routed.

For example, when a packet is being routed to a congested downlink port to a host device (e.g., third host device 134 and/or fourth host device 136), a back pressure message or "pause" may be generated. This pause does not generate a deadlock condition in network 100 because the packet is not heading to another spine switch, i.e., is not following a valley routing path. As a result, packets associated with the no-drop class of service are not dropped by the hardware ASIC. Likewise, if a packet is being routed to an uncongested uplink port to be transmitted to another spine switch (e.g., first spine switch 102 or second spine switch 104), packets associated with the no-drop class of service are not dropped by the hardware ASIC. In this case, while a valley routing condition is detected (i.e., spine-leaf-spine), because the packet buffer of the outbound uplink port is not congested (e.g., queue 416 of egress packet buffer 412 is less than predetermined threshold 414), transmitting the packets will not generate a deadlock condition.

The hardware ASIC of fourth leaf switch 126 will drop packets associated with the no-drop class of service, however, when the packet buffer of the outbound uplink port is congested (e.g., queue 416 of egress packet buffer 412 exceeds predetermined threshold 414). For example, in the embodiment shown in FIG. 4, packet 420 is being routed to outbound uplink port 410 to be transmitted to another spine switch (e.g., second spine switch 104) and queue 416 at egress packet buffer 412 of outbound uplink port 410 exceeds predetermined threshold 414, indicating that outbound uplink port 410 is congested. In this situation, the hardware ASIC of fourth leaf switch 126 may drop packet 420 before packet 420 is transmitted from outbound uplink port 410 even though packet 420 may be associated with a no-drop class of service. With this arrangement, congestion is alleviated and a deadlock condition in network 100 is avoided.

Figure 5:
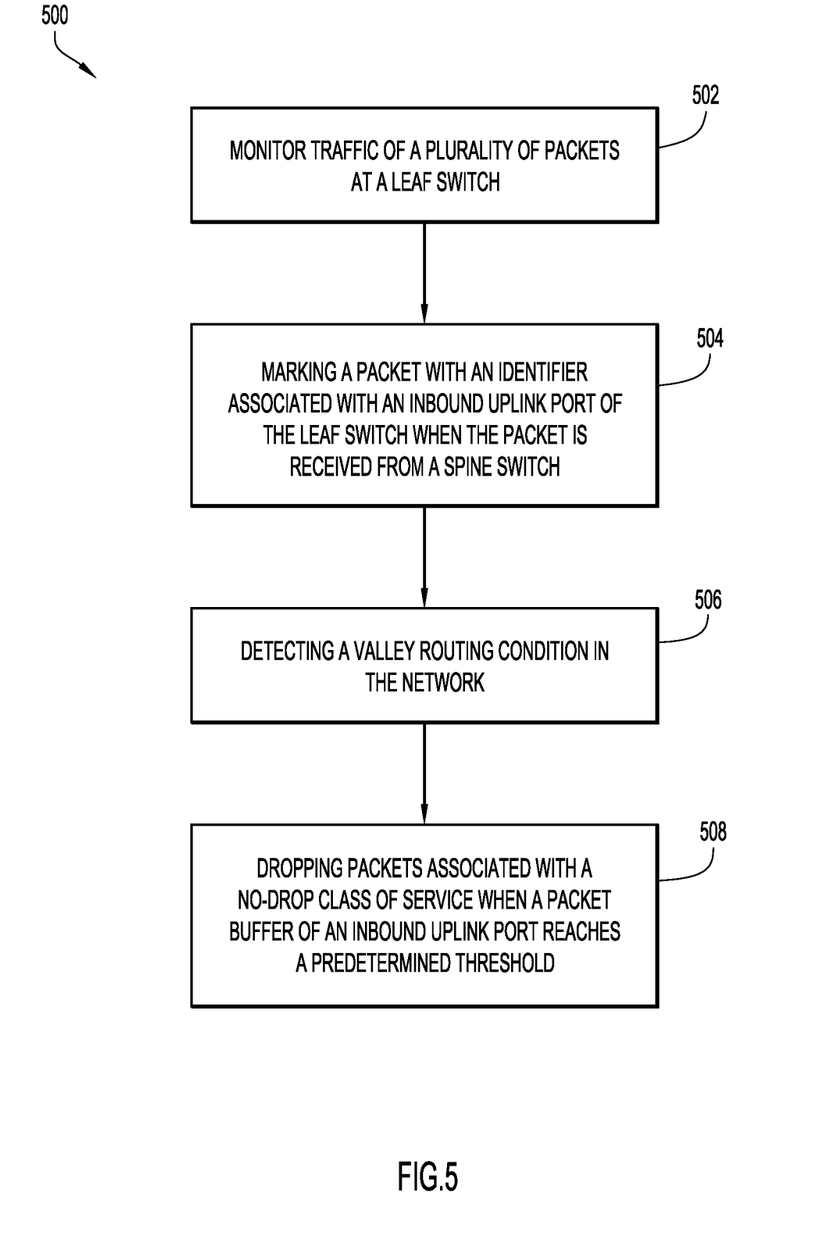
FIG. 5 is a flowchart of a method for implementing techniques for deadlock avoidance in a leaf-spine network, according to an example embodiment.

FIG. 5 is a flowchart of a method 500 for implementing techniques for deadlock avoidance in leaf-spine network 100, according to an example embodiment. In this embodiment, method 500 may be implemented by a leaf switch, for example, any one or more of leaf switches 120, 122, 124, 126, described above. Additionally, method 500 may be implemented concurrently by more than one leaf switch in network 100, for example, as shown in the scenario illustrated in FIG. 2.

In this embodiment, method 500 may begin at an operation 502 where a leaf switch monitors traffic of a plurality of packets. As used herein and in the claims, the term packet may be used in a generic sense to include packets, frames, segments, datagrams, and/or other generic data units that may be used to transmit data and/or commands in a network. Next, at an operation 504, method 500 includes marking a packet with an identifier associated with an inbound uplink port of the leaf switch when the packet is received from a spine switch. For example, as shown in FIG. 1, first leaf switch 120 may mark packet 140 received from first spine switch 102 with an identifier when packet 140 is received at an inbound uplink port of first leaf switch 120.

Next, method 500 includes detecting a valley routing condition in the network. As previously described, a valley routing condition in the network (e.g., network 100) is detected when a packet received from a spine switch is being routed to be transmitted back to a spine switch. For example, packet 140 that was previously marked with the identifier designating that it was received at an inbound uplink port of first leaf switch 120 from a spine switch is being routed to an outbound uplink port to be transmitted to another spine switch (e.g., first spine switch 102).

Upon detecting the valley routing condition in the network, at an operation 508, packets associated with a no-drop class of service are dropped when a packet buffer of an inbound uplink port reaches a predetermined threshold. For example, first leaf switch 120 may implement operation 150 to drop packets associated with a no-drop class of service that are headed to the outbound uplink port of first leaf switch 120 to alleviate the congestion and avoid a deadlock condition.

Figure 6:
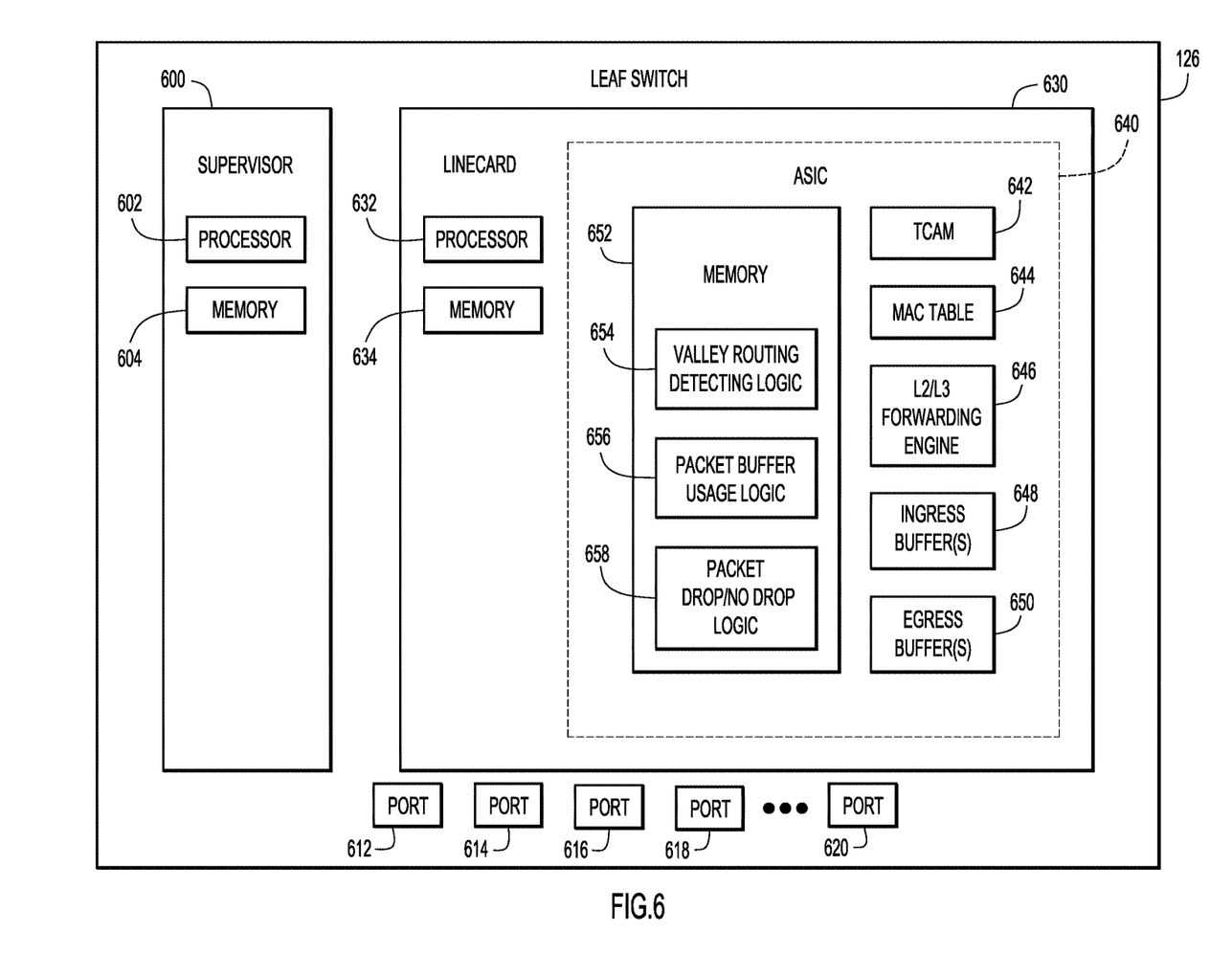
FIG. 6 is a block diagram of a leaf switch for implementing techniques for deadlock avoidance in a leaf-spine network, according to an example embodiment.

FIG. 6 is a block diagram of a representative leaf switch (e.g., fourth leaf switch 126) configured to perform techniques for deadlock avoidance in leaf-spine network 100, according to an example embodiment. Other leaf switches may have a similar configuration to perform these deadlock avoidance techniques. The leaf switch may include a supervisor module/section 600 and a linecard 630. While one linecard 630 is shown in FIG. 6, it is to be understood that the switch may have multiple linecards. Supervisor 600 may include a processor 602 and a memory 604. The processor 602 may be embodied by one or more microprocessors or microcontrollers. In some embodiments, processor 602 may poll the leaf switch (e.g., fourth leaf switch 126) regarding the status of packet buffers, including one or more Ingress Buffer(s) 648 and Egress Buffer(s) 650, described below to determine whether the packet buffer congestion reaches a predetermined threshold, as described above.

Linecard 630 may include a processor 632 and a memory 634. Linecard 630 can also include a ternary content-addressable memory (TCAM) 642, a Media Access Control (MAC) table 644, an L2/L3 Forwarding Engine 646, one or more Ingress Buffer(s) 648 and Egress Buffer(s) 650, and a memory 652. These components may be embodied as a hardware ASIC 640. The TCAM 642 may store data in entries that specify match criteria for networking features to be performed for packets that meet the match criteria, for example, as described with regard to operations of method 500 above. Various operations of a leaf switch described above may be embodied by instructions stored in memory 652 and executed by ASIC 640. For example, memory 652 may include instructions for implementing one or more of a valley routing detection logic 654, a packet buffer usage logic 656, and/or a packet drop/no-drop logic 658 to implement various operations of a leaf switch described above in reference to FIGS. 1-5.

The leaf switch may also include a plurality of network ports 612, 614, 616, 618, 620, which may include uplink and/or downlink ports, at which ingress traffic is received at the leaf switch and from which egress traffic is transmitted from the leaf switch. The number of ports shown in FIG. 6 is only by way of example and it should be understood that there may be more or fewer ports on the leaf switch.

Many data centers are using PFC to create a no-drop class of service in a network for critical storage traffic. This no-drop class of service can suffer from a deadlock condition when routing topologies occur that cause temporary routing loops while converging, such as link failures and/or host relocation. The deadlock condition occurs due to a condition known as a circular buffer dependency (CBD). The current solution is to detect the deadlock condition and reset links or queues that are involved which can result in a larger than needed amount of traffic to be dropped. The principles of the example embodiments described herein can provide a technique to avoid a deadlock condition in a network by preventing deadlock before it occurs by potentially dropping traffic flows that are causing a problem when congestion begins to build. In contrast, previous methods attempt to react to the deadlock condition after it occurs.

The example embodiments provide a solution to deadlock avoidance that prevents the deadlock condition from occurring in the first place in certain, specific network topologies, i.e., leaf-spine or "fat-tree" topology. The principles of the example embodiments described herein prevent the deadlock condition from occurring by detecting traffic that is transiting a leaf switch, i.e., a valley routing path, and using this detection to move packets that are looping to a "drop" service/operation in the leaf switch to prevent the conditions which give rise to the deadlock condition. Thus, eliminating the CBD.

In summary, a method is provided comprising: monitoring traffic of a plurality of packets at a leaf switch in a network having a leaf-spine topology, the network including a first spine switch connected to the leaf switch and a second spine switch connected to the leaf switch; marking a packet of the plurality of packets with an identifier associated with an inbound uplink port of the leaf switch when the packet is received from one of the first spine switch and the second spine switch; detecting a valley routing condition in the network upon determining, by the leaf switch, that the packet marked with the identifier associated with the inbound uplink port of the leaf switch is being routed to an outbound uplink port of the leaf switch to be transmitted to one of the first spine switch and the second spine switch; and upon detecting the valley routing condition in the network, dropping packets associated with a no-drop class of service, at the leaf switch, when a packet buffer of the inbound uplink port reaches a predetermined threshold.

In another form, a non-transitory computer readable storage media encoded with instructions that, when executed by a processor of a leaf switch in a network having a leaf-spine topology, cause the processor to: monitor traffic of a plurality of packets in the network, the network including a first spine switch connected to the leaf switch and a second spine switch connected to the leaf switch; mark a packet of the plurality of packets with an identifier associated with an inbound uplink port of the leaf switch when the packet is received from one of the first spine switch and the second spine switch; detect a valley routing condition in the network upon determining that the packet marked with the identifier associated with the inbound uplink port of the leaf switch is being routed to an outbound uplink port of the leaf switch to be transmitted to one of the first spine switch and the second spine switch; and upon detection of the valley routing condition in the network, drop packets associated with a no-drop class of service, at the leaf switch, when a packet buffer of the inbound uplink port reaches a predetermined threshold.

Furthermore, an apparatus is provided comprising: a plurality of network ports configured to receive inbound packets and to send outbound packets in a network having a leaf-spine topology, the network including a first spine switch connected to one of the plurality of network ports and a second spine switch connected to one of the plurality of ports; a processor coupled to the plurality of network ports, wherein the processor is configured to: mark a packet of the plurality of packets with an identifier associated with an inbound uplink port of the plurality of network ports when the packet is received from one of the first spine switch and the second spine switch; detect a valley routing condition upon determining that the packet marked with the identifier associated with the inbound uplink port is being routed to an outbound uplink port to be transmitted to one of the first spine switch and the second spine switch; and upon detection of the valley routing condition in the network, drop packets associated with a no-drop class of service when a packet buffer of the inbound uplink port reaches a predetermined threshold.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    monitoring traffic of a plurality of packets at a leaf switch in a network, the network including a first spine switch connected to the leaf switch and a second spine switch connected to the leaf switch;
    marking a packet of the plurality of packets with an identifier associated with an inbound uplink port of the leaf switch when the packet is received from one of the first spine switch and the second spine switch;
    detecting a valley routing condition in the network when the packet marked with the identifier is being routed to an outbound uplink port of the leaf switch to be transmitted to one of the first spine switch and the second spine switch; and
    upon detecting the valley routing condition in the network, dropping packets associated with a no-drop class of service, at the leaf switch.

2. The method of claim 1, wherein the method further comprises:
    upon detecting the valley routing condition in the network, changing a service level of the packets associated with a no-drop class of service to a class of service that is eligible to be dropped.

3. The method of claim 2, wherein the packets that are eligible to be dropped are not dropped unless a packet buffer associated with the inbound uplink port reaches a predetermined threshold.

4. The method of claim 1, further comprising receiving information associated with packet buffer usage of the inbound uplink port and of the outbound uplink port.

5. The method of claim 1, wherein the packets associated with the no-drop class of service are not dropped when a packet buffer associated with the inbound uplink port is less than a predetermined threshold.

6. The method of claim 1, wherein the packets are dropped by an application-specific integrated circuit in the leaf switch.

7. The method of claim 1, wherein the leaf switch includes a downlink port connected to at least one host device; and
    wherein the valley routing condition is detected when the packet marked with the identifier associated with the inbound uplink port of the leaf switch is being routed to the outbound uplink port of the leaf switch to be transmitted to one of the first spine switch and the second spine switch without traversing the downlink port to the least one host device.

8. One or more non-transitory computer readable storage media encoded with instructions that, when executed by a processor of a leaf switch in a network, cause the processor to:
    monitor traffic of a plurality of packets in the network, the network including a first spine switch connected to the leaf switch and a second spine switch connected to the leaf switch;
    mark a packet of the plurality of packets with an identifier associated with an inbound uplink port of the leaf switch when the packet is received from one of the first spine switch and the second spine switch;
    detect a valley routing condition in the network when the packet marked with the identifier is being routed to an outbound uplink port of the leaf switch to be transmitted to one of the first spine switch and the second spine switch; and
    upon detecting the valley routing condition in the network, drop packets associated with a no-drop class of service, at the leaf switch.

9. The non-transitory computer readable storage media of claim 8, wherein the instructions further cause the processor to:
    upon detection of the valley routing condition in the network, change a service level of the packets associated with a no-drop class of service to a class of service that is eligible to be dropped.

10. The non-transitory computer readable storage media of claim 9, wherein the packets that are eligible to be dropped are not dropped unless a packet buffer associated with the inbound uplink port reaches a predetermined threshold.

11. The non-transitory computer readable storage media of claim 8, wherein the instructions further cause the processor to:
receive information associated with packet buffer usage of the inbound uplink port and of the outbound uplink port.

12. The non-transitory computer readable storage media of claim 8, wherein the packets associated with the no-drop class of service are not dropped when a packet buffer associated with the inbound uplink port is less than a predetermined threshold.

13. The non-transitory computer readable storage media of claim 8, wherein the packets are dropped by an application-specific integrated circuit in the leaf switch.

14. The non-transitory computer readable storage media of claim 8, wherein the leaf switch includes a downlink port connected to at least one host device; and
wherein the valley routing condition is detected when the packet marked with the identifier associated with the uplink port of the leaf switch is being routed to the outbound uplink port of the leaf switch to be transmitted to one of the first spine switch and the second spine switch without traversing the downlink port to the least one host device.

15. An apparatus comprising:
a plurality of network ports configured to receive inbound packets and to send outbound packets in a network, the network including a first spine switch connected to one of the plurality of network ports and a second spine switch connected to one of the plurality of network ports;
a processor coupled to the plurality of network ports, wherein the processor is configured to:
mark a packet with an identifier associated with an inbound uplink port of the plurality of network ports when the packet is received from one of the first spine switch and the second spine switch;
detect a valley routing condition in the network when the packet marked with the identifier is being routed to an outbound uplink port to be transmitted to one of the first spine switch and the second spine switch; and
upon detection of the valley routing condition in the network, drop packets associated with a no-drop class of service.

16. The apparatus of claim 15, wherein the processor is further configured to:
upon detection of the valley routing condition in the network, change a service level of the packets associated with a no-drop class of service to a class of service that is eligible to be dropped.

17. The apparatus of claim 16, wherein the packets that are eligible to be dropped are not dropped unless a packet buffer associated with the inbound uplink port reaches a predetermined threshold.

18. The apparatus of claim 15, wherein the processor is further configured to receive information associated with packet buffer usage of the inbound uplink port and of the outbound uplink port.

19. The apparatus of claim 15, wherein the packets are dropped by an application-specific integrated circuit disposed in the apparatus.

20. The apparatus of claim 15, further comprising a downlink port of the plurality of network ports that is connected to at least one host device; and
wherein the valley routing condition is detected when the packet marked with the identifier associated with the inbound uplink port is being routed to the outbound uplink port of the plurality of network ports to be transmitted to one of the first spine switch and the second spine switch without traversing the downlink port to the least one host device.

* * * * *